June 20, 1933.    C. D. AINSWORTH    1,914,551

INSULATION OF INCLOSED ELECTRIC CONDUCTORS

Filed Nov. 25, 1929

Inventor:
Chester D. Ainsworth
by
atty

Patented June 20, 1933

1,914,551

UNITED STATES PATENT OFFICE

CHESTER D. AINSWORTH, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

INSULATION OF INCLOSED ELECTRIC CONDUCTORS

Application filed November 25, 1929. Serial No. 409,536.

This invention relates to high tension inclosed bus structures and similar electrical apparatus wherein a high tension conductor is inclosed in a metal housing and is insulated, at least in part, therefrom by means of an insulating compound which is poured into the housing while hot and in a fluid state and which hardens upon cooling into a solid or semi-solid mass about the conductor. The hot compound is so quickly cooled when it strikes the cold metal housing and the cold bus bars that voids are, or may be, left in the insulation between the conductor and housing which dangerously impair the insulation of the conductor.

The insulating compound usually contains occluded gases which may be formed therein by the chemical decomposition of the compound due to heating it at too high a temperature. Furthermore, considerable air usually is entrapped in the compound during the process of pouring it into the housing. The presence of the occluded or entrapped gases is highly undesirable, especially when the compound is subjected to high voltages, since the gases form regions of low insulation in the compound. The gases also become ionized when subjected to a high tension electrostatic field and act upon the compound to destroy gradually its high degree of insulation.

It is an object of the present invention to provide means to heat the bus structure and the inclosing housing at least to a compound-flowing temperature at the time the compound is poured into the housing, whereby to prevent the immediate chilling and solidification of the compound on the metal parts; and to maintain the compound in the housing in a free-flowing heated state against its normal tendency to cool and harden, for a sufficient period of time to enable the occluded and entrapped gases to escape from the compound, whereupon the gas-free compound is allowed to cool and harden.

Another object is to heat the inclosing housing and the bus bar or bars electrically, by passing such a heavy alternating current through the inclosed bus bar that it becomes heated to a compound-melting temperature by reason mainly of its resistance, the current also setting up such a high alternating magnetic flux that eddy currents and hysteresis losses are set up in the inclosing housing and the metal parts within the housing associated either therewith or with the bus structure therein, the eddy currents and hysteresis losses being great enough to heat the housing and the metal parts to a compound-melting temperature. Thus, the fluid compound or equivalent insulation adjacent the heated buses, the housing walls and the metal parts can be maintained in free-flowing fluid condition for a period of time after it has been poured into the housing to permit the liberation of occluded or entrapped gases.

By this method of heating, the bus, in the usual instance, is heated to a higher degree than other parts of the system. This has been found to be highly advantageous. The usual solid or semi-solid insulating compound has no critical melting point but becomes increasingly fluid with increasingly elevated temperatures. Thus, it is most fluid in the immediate vicinity of the bus and so thereat has the least amount of occluded gas and thus has the highest degree of insulation. Inasmuch as the electrostatic field intensity is greatest at and in the immediate vicinity of the high tension bus, when it is energized at normal potential, this method provides the highest degree of insulation where it is most needed; and this constitutes a further object of the invention. The gas may not be so completely driven out of the compound in the lower temperature regions remote from the conductor or bus, so that the insulation or dielectric strength of the compound may not be so great at such regions as at the bus but this is not harmful since the electrostatic field strength is low at such regions.

A further object of the invention is the provision of electromagnetic means for creating a strong alternating magnetic field about the conductor whereby to set up secondary, or eddy, currents in the housing and heat it at the time the housing is being filled with compound.

A still further object is the provision of means including the conductor to be insulated to set up a concentrated alternating flux in the housing to heat it.

A yet further object is the provision of magnetic means temporarily associated with the housing for concentrating the flux threading the housing whereby to increase the eddy currents set up therein and heating the housing at the time of pouring the compound.

A further object is generally to improve the insulation of high tension compound-insulated electrical conductors.

The invention is illustrated in connection with an inclosed bus structure although the invention is applicable to other compound insulated electrical apparatus.

Figures 1, 2:
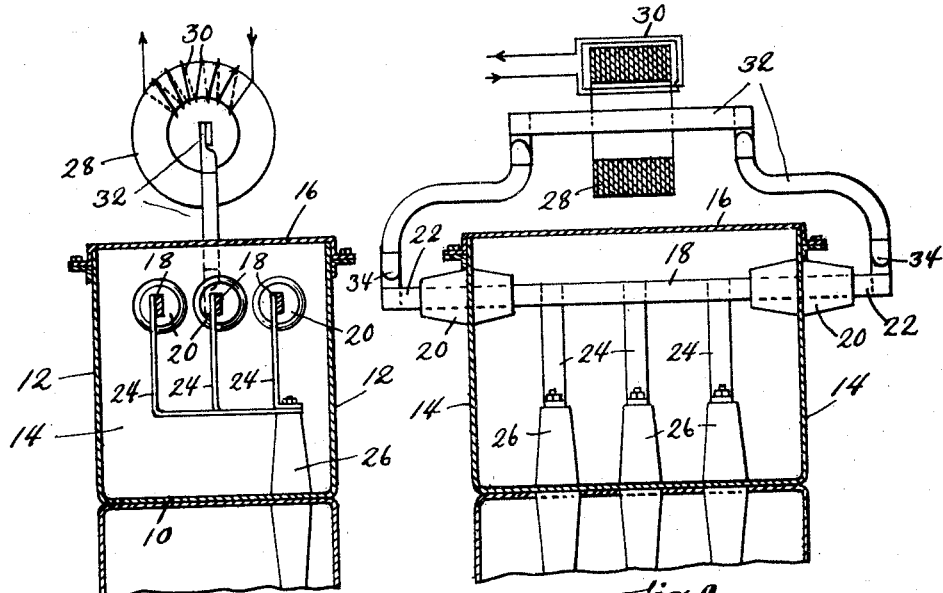
Fig. 1 is a sectional side elevation showing an inclosed bus having the compound-heating apparatus embodying the invention associated therewith.
Fig. 2 is a front sectional elevation of the housing and apparatus of Fig. 1.

As shown diagrammatically in Figs. 1 and 2, each section of the bus structure embodying the invention includes a rectangular metal housing open at the top and including a bottom wall 10, side and end walls 12 and 14, and a removable top wall 16 which forms a closure for the open top of the housing. Said housing incloses a three-phase bus structure including the spaced, aligned bus bar sections 18 which are separately supported in position in the housing by suitable means as the pairs of insulating bushings 20 which are carried by and extend through the end walls 14 of the housing. Said bus bars are adapted to extend through and beyond said bushings 20 to provide terminal or attaching portions 22 by which they are adapted to be electrically connected with other adjacent sections. Conductors 24 which are separately connected electrically with the bus bars 18 extend downwardly through the bottom wall 10 of the casing and are insulated therefrom by means of bushings 26 which extend above and below said bottom wall 10. Said conductors 24 are adapted to be connected at their lower ends with the terminals of an electric switch, not shown.

The bus bar sections 18 and conductors 24 are adapted to be embedded in a solid insulating compound which completely fills the inclosing housing and incloses the buses, which compound is relied upon to insulate the buses electrically from the housing. The insulation is adapted to be poured into the housing, after the bus-conductors are in place therein, in a heated and liquid state and is adapted to harden upon cooling into a solid mass about the conductors. Due to the cooling effect of the cold walls of the housing on the hot compound as it is poured in, great difficulty is experienced in preventing the presence of voids in the insulation and consequent breaking down of the insulation due to flash over between the conductor and the housing. Furthermore, in pouring the compound into the casing considerable air is entrapped in the compound.

In accordance with the present invention, means are provided to heat the bus electrically and the inclosing housing electromagnetically whereby to prevent the chilling and delay the cooling of the insulating compound until it has completely filled the housing and until all entrained air has been driven off, thus to provide a compact insulating mass about the conductors which completely fills the housing and which is free from voids such as air and gas bubbles.

The heating of the casing is accomplished preferably by means of a heavy-current transformer including a core 28, a multi-turn primary winding 30 and a few-turn secondary winding 32 which includes one section 18 of the bus, the leads 34 of the transformer secondary being connected at the extended portions 22 of the bus, thus to include the bus in the secondary of the transformer. The primary of the heating transformer is connected with a suitable alternating current power supply and, due to the large-turn ratio of the primary and secondary coils thereof, a heavy current is induced in the secondary which traverses the conductor 18. The housing inclosing the conductor 18 is commonly made of ferrous material as cast iron or steel, sheet iron, or other conducting material of relatively good magnetic permeability and acts to increase and concentrate the magnetic flux about the conductor 18. The housing thus acts as a closed magnetic and electric conductor which is acted on by the alternating flux set up by the current traversing the bus 18, giving rise to eddy currents in the housing which heat the housing and thus maintain the compound therein in a fluid state so long as is necessary to sufficiently remove any air entrained therein. The heating of the bus and the housing can be controlled easily by varying the current in the primary of the transformer. The rapid reversal of magnetism in the conductor housing also sets up considerable heating effect due to hysteresis losses, which further increases the heating effect in the housing.

In practising the invention, it is usually sufficient to heat the bus and the inclosing housing, prior to pouring the compound, to a temperature equal to or slightly higher than the pouring temperature of the compound. The heating of the housing will be considerably accelerated by putting the cover 16 in place on and in contact with the side walls of the housing during the heating process whereby to provide a closed magnetic circuit for the flux threading the side walls 14 and bottom wall 10. When the housing has been heated to a suitable temperature, the cover is removed and the housing is completely filled with the hot compound which, due to the heat stored in the housing walls, remains liquid for a considerable time and can flow into and completely fill the housing.

The electrical heating of the metal parts is continued for a sufficient time to drive off the occluded and entrapped gas in the compound. When the gas has been driven off, at least sufficiently for the purpose, the heating can be stopped and the gas-free compound will cool gradually and become hard. Since all the metal parts and the compound are hot, the cooling will take place gradually, so that the compound can adjust itself to changes in dimensions due to temperature variations, prior to its becoming non-fluid, thus to prevent the formation of voids therein.

Figures 3, 4:
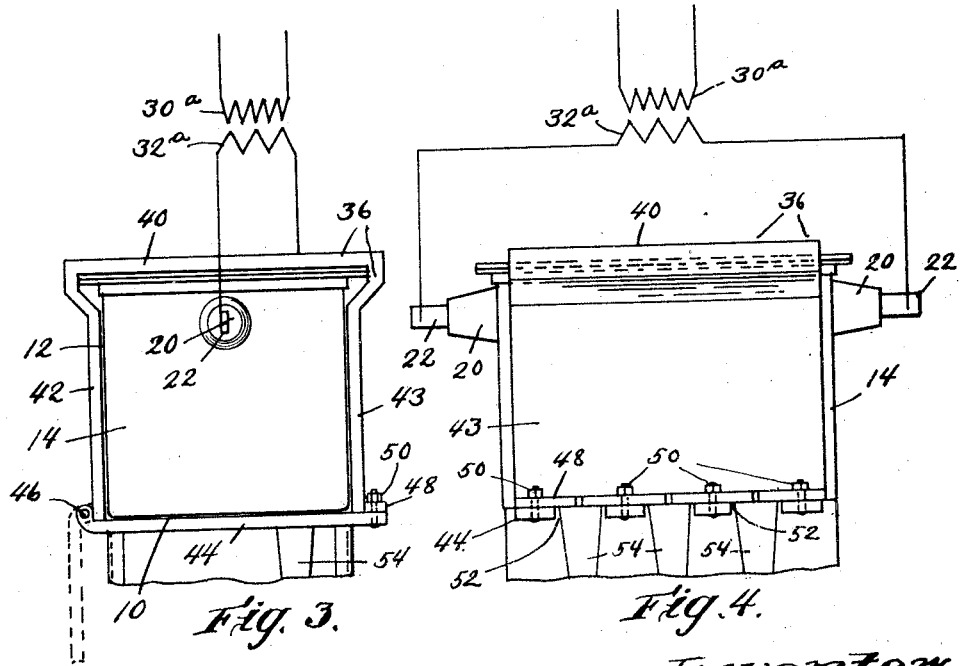
Figs. 3 and 4 show side and front elevations, respectively, of a modified form of the invention adapted for use with non-magnetic housings.

If, by reason of the high ampere capacity of the bus, the inclosing housing is constructed of non-magnetic material, it is necessary to provide a temporary magnetic circuit around the housing to produce inductively a condition of elevated temperature of the housing. Such an arrangement is shown in Figs. 3 and 4, wherein a peripheral magnetic casing or jacket 36 is provided about the inclosing housing of the bus section for the purpose of inductively heating the housing. Said casing, which may be substantially coextensive with the length of the bus housing, includes a top wall 40, two depending side walls 42 and 43 and a bottom wall 44 which is hinged at 46 to the lower edge of the side wall 42. Said wall 43 is provided at its lower end with an outstanding flange 48. Bolts 50, extended through said flange 48 and the free end of the bottom wall 44, serve to secure the bottom wall firmly in contact with flange 48 whereby to provide a closed magnetic circuit of relatively low reluctance about the housing. Said lower wall 44 is provided with suitable slots 52 to accommodate the depending bushings 54 carried by the bottom wall 44 of the bus housing. It will be evident that, with this arrangement, when a suitable potential is applied across the primary winding 30a of the transformer the heavy current flowing in the secondary 32a of the transformer will cause an increased flux to be set up which is concentrated at and cuts the non-magnetic housing of the bus compartment, thus to set up heavy eddy currents in the housing and consequent heating thereof. The flux is enhanced by reason of the increased permeability of the iron circuit. The magnetic casing also becomes heated due to eddy currents and hysteresis losses therein and further heats the housing.

Various modifications of the apparatus will occur to one skilled in the art and various changes may be made in the specific apparatus to suit different types of inclosing casings without departing from the scope of the invention.

I claim:

1. The method of assembling metal clad electrical apparatus of the type in which the inclosed conductors are insulated from their inclosing housing by a normally solid insulating body which is introduced into the housing in a heated and liquid state, which method comprises heating the insulating material to a temperature at which it becomes liquid, heating the conductor electrically and the metal housing electromagnetically to a temperature at which the insulating body is in a liquid state, pouring the liquid insulating material into the heated housing, and continuing the heating after the liquid insulating material is poured into the housing.

2. The method of assembling a metal clad electrical apparatus of the type in which conductors are insulated from their inclosing housing by a normally solid insulating material which is introduced into the housing in a heated and liquid state, which method comprises heating the insulating material to a temperature at which it flows readily, heating the metal inclosing housing electromagnetically to a temperature equal at least to that of the flow-temperature of the insulating material, pouring the insulating material into the heated housing, and continuing the heating after the liquid insulating material is poured into the housing whereby to delay the solidifying of the material, thus permitting the material to completely occupy the housing.

3. The method of assembling a metal clad electrical apparatus of the type in which conductors are insulated from their inclosing housing by a normally solid insulating material which is introduced into the housing in a heated and liquid state, which method comprises passing an alternating current through the conductor within the housing whereby to set up induced eddy currents in the metallic housing and heat it, pouring the liquid insulating material into the heated housing, and continuing the heating after the liquid insulating material is poured into the housing and allowing both to cool when the material has completely filled the housing.

4. The method of assembling a metal clad electrical apparatus of the type in which conductors are insulated from their inclosing housing by a normally solid insulating material which is introduced into the housing in a heated and liquid state, which method comprises establishing an alternating electromagnetic field, the flux of which cuts said

currents which heat the inclosure, and a magnetic means surrounding said inclosure to increase the flux acting on the inclosure.

14. The method of insulating an electric conductor inclosed within a housing by an insulating material which is solid at normal temperatures, which method consists in electrically heating the conductor and also the housing at least to a temperature at which the insulating material is fluid, separately heating the insulating material to a fluid temperature and pouring the fluid material into the housing and around the conductor, and maintaining the insulating material in a hot fluid state in the housing against the normal tendency for the material to cool and solidify for a period of time sufficient to permit the escape of such a deleterious amount of gas contained in the material and the housing as would impair the insulation of the conductor, and then permitting the gas-free insulating material to cool and become solid.

15. The method of insulating an electric conductor inclosed within a housing by a gas-containing insulating material, which method consists in introducing the insulating material in hot fluid condition into the housing and around the conductor, and heating the conductor to a temperature which is maintained for a sufficient period of time to drive off the gas in that portion of the fluid insulating material in contact with and immediately surrounding the conductor, whereby to provide that portion of the insulating material with a high degree of insulation where the electrostatic field intensity is greatest.

In testimony whereof, I have signed my name to this specification.

CHESTER D. AINSWORTH.